Patented Jan. 19, 1937

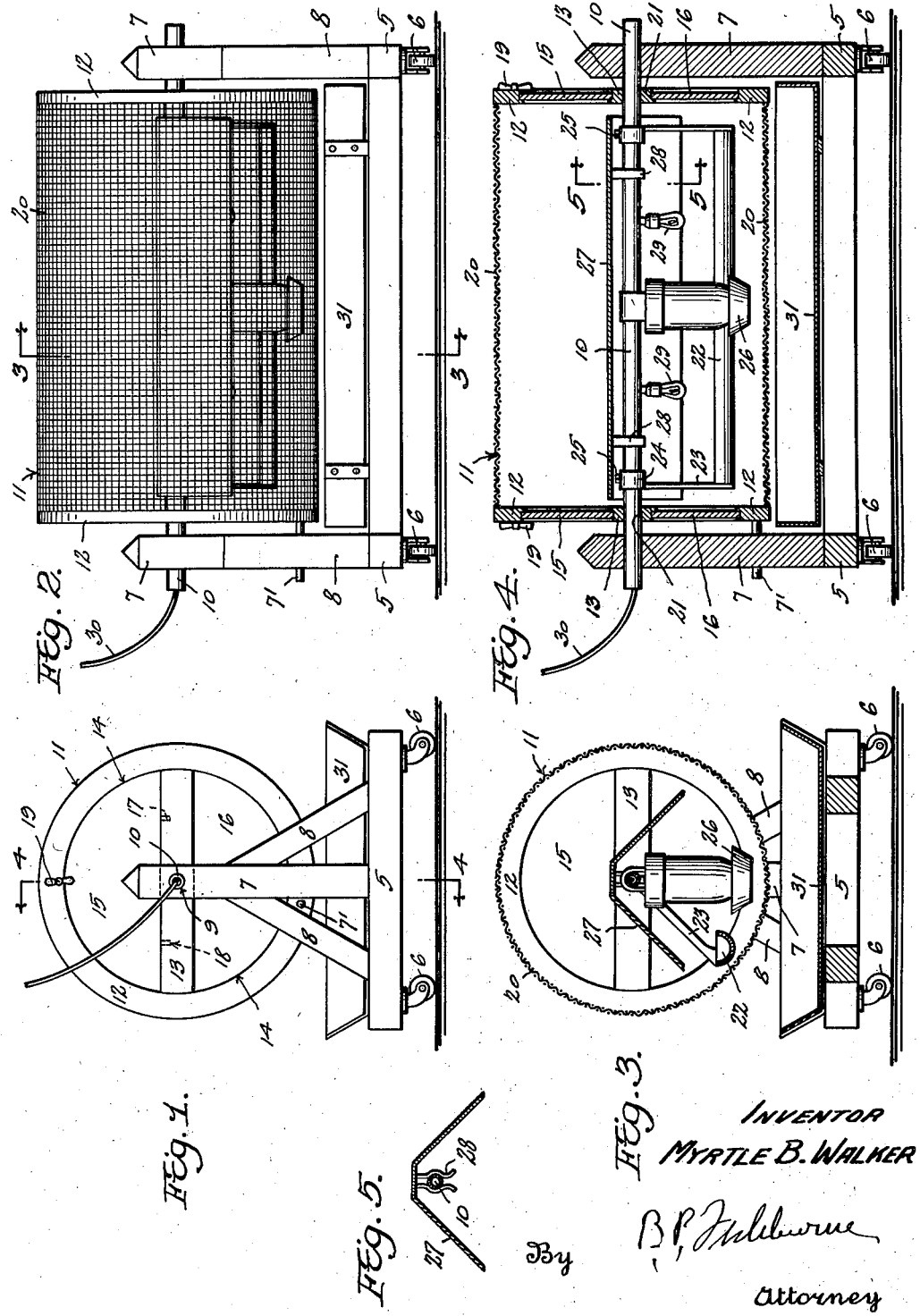

2,068,210

UNITED STATES PATENT OFFICE 2,068,210

COMBINED BROODER, FEEDER, AND EXERCISER

Myrtle B. Walker, Perry, S. C.

Application October 11, 1935, Serial No. 44,575

6 Claims. (Cl. 119—33)

My invention relates to a combined chicken brooder, feeder, and exerciser.

An important object of the invention is to provide apparatus of the above-mentioned character, so constructed that the chickens are given ample and proper exercise, while confined within the apparatus.

A further object of the invention is to provide means whereby the feed trough is adjustable with respect to the rotary drum, thereby regulating the speed of rotation of the drum by the chickens, and hence controlling the extent of exercise.

A further object of the invention is to provide apparatus of the above-mentioned character, which will protect the chickens from the elements, such as excessive heat and rain, yet affording ample ventilation.

A further object of the invention is to provide means to heat the apparatus.

A further object of the invention is to provide apparatus of the above-mentioned character, which is of simple construction, cheap to manufacture, portable, and convenient in use.

Other objects and advantages of the invention will be apparent during the course of the following description.

In the accompanying drawing, forming a part of this specification, in which like numerals are employed to designate like parts throughout the same, Figure 1 is an end elevation of apparatus embodying my invention, Figure 2 is a side elevation of the same, Figure 3 is a transverse section taken on line 3—3 of Figure 2.

Figure 4 is a longitudinal section taken on line 4—4 of Figure 1, and

Figure 5 is a detail section taken on line 5—5 of Figure 4.

In the drawing, wherein for the purpose of illustration is shown a preferred embodiment of my invention, the supporting structure of the apparatus embodies a horizontal frame 5, provided at its corners with castors 6, to render the apparatus readily portable. Rigidly attached to the ends of the frame 5 are vertical uprights 7, connected with diagonal braces 8, as shown.

Extending through openings 9, formed in the upper ends of the uprights 7, is a non-rotatable tubular shaft 10. This shaft may be held stationary within the openings 9 by frictional engagement, although additional clamping means may be provided, if desired.

The numeral 11 designates a rotatable drum, as a whole, carried by the tubular shaft 10, and turning thereon with relation thereto. This drum includes end members comprising outer rings 12, supported by diametrically extending bars 13, arranged therein, and rigidly attached thereto. The bars 13 form with the ring 12, segmental openings or passages 14, closed by doors or cover elements 15 and 16. The door 16 is preferably permanently held within the segmental opening, while the door 15 is removable. The door 15 is held in place by pins 17, attached to its straight edge, adapted to enter recesses 18, formed in the bar 13, such pins cooperating with a rotary latch or keeper 19, pivoted to the ring 12, as shown. The two ends are connected by a periphery 20, formed of stout, stiff, woven wire fabric, such as a three-eighths inch gauge wire fabric. This wire fabric is rigidly attached to the peripheries of the rings 12, as shown. The bars 13 have openings 21 formed therein, rotatably receiving the tubular shaft 10. These bars may be equipped with a bearing or bushing, if desired. The drum or cylinder 11 is, therefore, rotatably supported upon the tubular shaft 10.

Arranged within the lower portion of the drum is a relatively stationary feed trough 22, extending throughout the major portion of the length of the drum. This feed trough is supported by radial arms 23, having sleeves 24, receiving the tubular shaft 10. These sleeves are provided with set screws 25. By loosening the set screws 25, the feed trough 22 may be adjusted upwardly or downwardly, and the arms 23 may then be locked to the stationary tubular shaft 10, by manipulation of the set screws 25. When the feed trough 22 is raised, the chickens must travel a greater distance from the bottom of the drum to the feed trough and hence, the drum will be rotated faster and an increased amount of exercise produced. By lowering the feed trough until it approaches or reaches the bottom of the drum, the extent of rotation of the drum may be reduced, or the rotation stopped entirely. During its adjustment, the trough 22 moves in a curved path, which is concentric to the periphery of the drum, and hence, the trough retains its slight spaced relation from the periphery of the drum.

A drinking trough 26, of any well known or preferred type, is suspended from the tubular shaft 10, near the center of the drum, as shown.

The numeral 27 designates a generally inverted U-shaped canopy, or guard, which may be formed of sheet metal. This canopy is adapted to be passed through the opening 14, and straddles the tubular shaft 10, protecting the chickens against heat, rain, or the like. In cold weather, the canopy retains heat within the lower portion of the apparatus. This canopy is preferably provided with resilient clips 28, adapted to receive the tubular shaft 10, and hold the canopy in place by frictional engagement with the tubular shaft.

Means are provided to heat the apparatus within or beneath the canopy 27, and this may be effected by means of electric bulbs 29, supported from wire or wires 30, which extend through the tubular shaft and project outwardly through openings in the side of the tubular shaft, as is obvious. In extremely cold weather, the entire drum may be covered with a cloth casing, or the like.

Mounted upon the horizontal frame 5, is a large pan 31, to catch the droppings.

In use, the young chickens are placed within the lower portion of the drum 11, and may remain in the drum until they have grown to adult or table size. The feed is placed within the feed trough 22, and this feed trough adjusted to the desired elevation. In eating, the chickens run up the lower portion of the drum toward the trough, thus causing the drum to be rotated, while they are eating. The desired exercise is thereby effected. Of course, when the chickens are not being fed, and there is no inducement for them to run up the sides of the drum, the drum would not be rotated to any considerable extent. It is thus seen that the apparatus is adapted to serve as a combined brooder, feeder, and exerciser.

The pin 7' is removably mounted in an opening formed in the ring 12, and is located between parts 7 and 8. This pin will hold the drum against rotation, but is removed when it is desired that the chickens rotate the drum.

It is to be understood that the form of my invention herewith shown and described, is to be taken as the preferred example of the same, and that various changes in the shape, size and arrangement of parts may be resorted to without departing from the spirit of the invention, or the scope of the subjoined claims.

Having fully described my invention, what I claim is:

1. A combined brooder, feeder and exerciser, comprising a supporting structure, a shaft carried thereby and held against turning movement with relation thereto, a rotatable drum mounted upon the shaft to turn with relation thereto, a feed trough arranged within the drum, an arm carrying the feed trough, and means for adjustably connecting the arm with the shaft and to clamp the arm to the shaft in a selected adjusted radial position.

2. A combined chicken brooder, feeder and exerciser, comprising a supporting structure, a relatively stationary shaft carried by the supporting structure, a drum rotatable upon the stationary shaft and including a foraminous periphery and covered ends to prevent the escape of the chickens, a feed trough arranged within the drum adjacent to the periphery of the drum so that the chickens travelling upon the periphery of the drum toward the feed trough rotate the drum, means bodily mounted within the drum and connecting the feed trough with the shaft for holding the feed trough stationary with relation to the shaft, and a canopy mounted upon the shaft and arranged above the feed trough.

3. A combined brooder, feeder and exerciser, comprising a supporting structure, a tubular shaft carried thereby, a drum rotatably mounted upon the tubular shaft, a feed trough within the drum and suspended from the shaft, wires extending through the tubular shaft and passing into the drum, and electrical heating means arranged within the drum and connected with the wires.

4. A combined brooder, feeder and exerciser, comprising a supporting structure, a tubular shaft carried thereby, a drum rotatably mounted upon the tubular shaft, a feed trough within the drum and suspended from the shaft, wires extending through the tubular shaft and passing into the drum, electrical heating means arranged within the drum and connected with the wires, and a canopy mounted upon the shaft and disposed above the heating means.

5. A combined chicken brooder, feeder and exerciser, comprising a supporting structure, a rotatable drum mounted upon the supporting structure and including a foraminous periphery and covered ends to prevent the escape of the chickens, a feed trough permanently mounted within the drum, and means to support the feed trough in the lower portion of the drum and in close relation to the periphery of the drum so that the chickens running upon the periphery toward the feed trough will rotate the drum.

6. A combined chicken brooder, feeder and exerciser, comprising a supporting structure, a rotatable drum mounted upon the supporting structure and including a foraminous periphery and covered ends to prevent the escape of the chickens, a feed trough mounted within the drum adjacent to the periphery of the drum, and adjustable means bodily mounted within the drum and movable circumferentially of the periphery of the drum and serving to support the feed trough and hold the same at a selected circumferentially adjusted position.

MYRTLE B. WALKER.